Patented Dec. 12, 1944

2,364,712

UNITED STATES PATENT OFFICE 2,364,712

CONDENSATION PRODUCTS OF PHENOLS AND PHENOLIC ETHERS, AND METHOD OF PREPARING THE SAME

Mortimer T. Harvey, East Orange, N. J., assignor to Harvel Research Corporation, a corporation of New Jersey No Drawing. Application October 10, 1942, Serial No. 461,600

12 Claims. (Cl. 260—613)

This invention relates to novel condensation products as well as method for preparing the same. This application is a continuation in part of application 174,662, filed November 15, 1937 and issued as Patent 2,317,607 on April 27, 1943.

The invention, in its specific aspect, is directed to the novel products produced by and my novel methods comprising subjecting a mixture of a phenol and preferably a phenol of the class consisting of hydroxybenzene, naphthol and anthranol and their homologues with a phenol ether having an unsaturated hydrocarbon substituent to a condensing reaction in the presence of a kationoid condensing agent.

In the reactions and the products of the present invention the phenolic groups involved can be of the monohydric or the polyhydric type.

The condensation reactions of the present invention are produced with the aid of kationic agents, also termed katenoid as well as kationoid condensing agents. The expression kationic, katenoid or kationoid condensing agent is used herein and in the claims in the sense of the recent electronic postulations of Robert Robinson, compare for instance his book on "Versuch einer Elektronentheorie organischchemischer Reaktionen," Verlag Ferdinand Enke, Stuttgart 1932, especially page 16. Such agents are protons and sources of protons, such as acids, metal atoms which are able to form coordination systems with water or ammonia, sulfur from sulfur dioxide, sulfuric acid, sodium bisulfite, atoms and free radicals with incomplete electron shells and the like. Especially suitable have been found the following agents: sulfuric acid, phosphoric acid, zinc chloride, aluminum chloride, boron trifluoride, benzene sulfonic acid, hydrochloric acid and other kationoid agents. They do not enter into reaction with the above mentioned reacting compounds but remain unchanged and act, thus, catalytically.

Following are illustrative examples of phenol ethers having unsaturated hydrocarbon substituents, which are suitable for use in the practice of the present invention: alkyl ethers of cashew nut shell liquid, of the distillate, as well as of the residue obtained from cashew nut shell liquid by heating said cashew nut shell liquid either at sub-atmospheric pressures or with steam, and also of the separate phenolic constituents thereof, namely, anacardic acid and cardol; alkyl ethers of cardanol, cardanol itself being obtained by distilling the anacardic acid constituent and thereby dissociating therefrom carbon and oxygen atoms other than those of the phenol nucleus and the unsaturated hydrocarbon substituent; alkyl ethers of marking nut shell liquid and the phenolic constituents thereof such as anacardol; alkyl ethers of urushiol, eugenol, isoeugenol, safrole and iso-safrole.

Examples of phenolic radicles of the phenol ethers are those of hydroxybenzene (carbolic acid) and its homologues including various ones of the cresols and xylenols. Examples of unsaturated hydrocarbon substituent radicles are the hydrocarbon substituent in indene, and also the following radicles, the crotyl, allyl, the methyl and other derivatives of the allyl, the vinyl, the propenyl, the isopropenyl and the several normal and iso-alkyl and alkoxy derivatives of the vinyl, propenyl and allyl (e. g. methyl and methoxy), and the cyclohexene radicle. These radicles generally are olefinic and unsaturated cyclo hydrocarbons, having an unsaturated bond at some place in the radicle.

The aryl nucleus of the phenol which can be condensed with the other substances, can be phenyl, naphthyl, anthranyl and various of the homologues thereof such as those of the various of the cresols and xylenols and of the corresponding or analogous naphthols and anthranols.

Illustrative specific examples of phenolic ethers having an unsaturated hydrocarbon substituent reacted with other phenols are:

Example 1.—Ethyl ether of cardanol and hydroxybenzene.

Example 2.—Amyl ether of cardanol and 1,4,2-xylenol.

Example 3.—Amyl ether of cashew nut shell liquid and cresylic acid.

Example 4.—Diethyl ether of urushiol and betanaphthol.

Example 5.—Eugenol and hydroxybenzene.

Example 6.—Anethole and ortho cresol.

Example 7.—Safrole and meta-para-cresol.

*Example A.—Phenol and ethyl ether of allyl phenol*

Equimolecular amounts of phenol (94 grams) and the ethyl ether of allyl phenol (162 grams) were mixed together. To this mixture was added a solution of 100 grams of concentrated sulfuric acid in 450 cc. glacial acetic acid. The entire mixture was heated to boiling under a reflux condenser and kept boiling for five hours. It was then poured into a large volume of water and the oil layer separated. This was distilled in vacuo. There was obtained a viscous, amber-colored oil of the amount of 80 grams (product A).

To 5 grams of this product was added 3 grams of diethyl sulfate and a solution of 2 grams of sodium hydroxide, in 18 cc. of water. This mixture was heated to boiling under a reflux condenser for 2 hours, and then the oily layer separated (product B). The oily layer was the ethyl ether of the above product A as indicated by the fact that when heated at about 120° C. with hexamethylenetetramine product B failed to form a resinous mass whereas product A, heated at 120° C. with hexamethylenetetramine did form a resin.

Example B—Ethyl ether of cashew nut shell liquid and cresols 175 grams of the ethyl ether of cashew nut shell liquid (about half a mole) and 54 grams of a mixture of the cresols (about half a mole) were mixed and then chilled in ice-water. To this were added slowly 30 cc. of concentrated sulfuric acid at such a rate as to keep the temperature below 25° C. The mixture was agitated throughout the addition of the acid. The finished mixture was then allowed to stand at room temperature overnight. It was then diluted with a large volume of water and salt was added to break the emulsion. A black, viscous oil was obtained. When this was heated with 5% of its weight of hexamethylenetetramine at 130° C., it formed a resin which when cured at 325° F. gave a tough, infusible, flexible mass.

In like manner, other alkyl ethers of the unsaturated phenols may be employed such as methyl, propyl, isopropyl, butyl, isobutyl, secondary butyl, amyl, isoamyl, and the various secondary aryl groups.

*Uses.*—The products of these reactions can be used for germicidal and insecticidal purposes and may be dispersed in an alcaline medium. They also can be reacted with aldehydes such as hexamethylenetetramine, water solution of formaldehyde, or paraformaldehyde with the aid of heat to obtain oil soluble resinous products for varnishes, paints, etc. They can be treated so that if there is a free phenolic group, it will be converted to ether groups, for example, by reacting with diethylsulphate and sodium hydroxide, the latter either in water or alcohol solution or in powdered form. The products of the above reactions can be sulphonated and used for wetting agents, dye bases and perfume bases. The products of the above reactions can be used with cellulose compounds as plasticizers, and with rubber, rubber compounds and synthetic rubber as a softener.

I claim:

1. The method which comprises subjecting a mixture of a phenol free of unsaturated hydrocarbon substituents and of the class consisting of hydroxybenzene, naphthol, anthranol and their homologues with an alkyl ether of a phenol having an unsaturated hydrocarbon substituent to a condensing reaction in the presence of a katenoid condensing agent.

2. The method which comprises subjecting a mixture of a phenol free of unsaturated hydrocarbon substituents and of the class consisting of hydroxybenzene, naphthol, anthranol and their homologues with an alkyl ether of cardanol to a condensing reaction in the presence of a katenoid condensing agent.

3. The method which comprises subjecting a mixture of a phenol free of unsaturated hydrocarbon substituents and of the class consisting of hydroxybenzene, naphthol, anthranol and their homologues with an alkyl ether of cashew nut shell liquid to a condensing reaction in the presence of a katenoid condensing agent.

4. The method which comprises subjecting a mixture of an alkyl ether of cardanol and hydroxybenzene to a condensing reaction in the presence of a katenoid condensing agent.

5. The method which comprises subjecting a mixture of an alkyl ether of cashew nut shell liquid and hydroxybenzene to a condensing reaction in the presence of a katenoid condensing agent.

6. The method which comprises subjecting a mixture of an alkyl ether of cardanol and a xylenol to a condensing reaction in the presence of a katenoid condensing agent.

7. The complex phenolic condensation products produced by subjecting a mixture of a phenol free of unsaturated hydrocarbon substituents and of the class consisting of hydroxybenzene, naphthol, anthranol and their homologues with an alkyl ether of a phenol having an unsaturated hydrocarbon substituent to a condensing reaction in the presence of a katenoid condensing agent.

8. The complex phenolic condensation products produced by subjecting a mixture of a phenol free of unsaturated hydrocarbon substituents and of the class consisting of hydroxybenzene, naphthol, anthranol and their homologues with an alkyl ether of cardanol to a condensing reaction in the presence of a katenoid condensing agent.

9. The complex phenolic condensation products produced by subjecting a mixture of a phenol of the class consisting of hydroxybenzene, naphthol, anthranol and their homologues with an alkyl ether of cashew nut shell liquid to a condensing reaction in the presence of a katenoid condensing agent.

10. The complex phenolic condensation products produced by subjecting a mixture of an alkyl ether of cardanol and hydroxybenzene to a condensing reaction in the presence of a katenoid condensing agent.

11. The complex phenolic condensation products produced by subjecting a mixture of an alkyl ether of cashew nut shell liquid and hydroxybenzene to a condensing reaction in the presence of a katenoid condensing agent.

12. The complex phenolic condensation products produced by subjecting a mixture of an alkyl ether of cardanol and a xylenol to a condensing reaction in the presence of a katenoid condensing agent.

MORTIMER T. HARVEY.